US012242715B1

(12) United States Patent
Perugupalli et al.

(10) Patent No.: US 12,242,715 B1
(45) Date of Patent: Mar. 4, 2025

(54) APPARATUS FOR CONTROL OF IMAGE PROCESSING ALGORITHMS IN A GRAPHICAL INTERFACE

(71) Applicant: Pramana, Inc., Cambridge, MA (US)

(72) Inventors: Prasanth Perugupalli, Cary, NC (US); Christopher Goel, Cambridge, MA (US)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 18/647,138

(22) Filed: Apr. 26, 2024

(51) Int. Cl.
| G06F 3/04845 | (2022.01) |
| G06F 3/0481 | (2022.01) |
| G06F 9/54 | (2006.01) |
| G06T 1/20 | (2006.01) |
| H04N 23/62 | (2023.01) |

(52) U.S. Cl.
CPC ........ G06F 3/04845 (2013.01); G06F 3/0481 (2013.01); G06F 9/542 (2013.01); G06T 1/20 (2013.01); H04N 23/62 (2023.01); G06T 2200/24 (2013.01)

(58) Field of Classification Search
CPC ... G06F 3/04845; G06F 3/0481; H04N 23/62; G06T 1/20; G06T 2200/24
See application file for complete search history.

(56) References Cited

U.S. PATENT DOCUMENTS

| 7,516,255 B1 | 4/2009 | Hobbs | |
| 11,757,743 B1 | 9/2023 | Davies-Barrett et al. | |
| 2011/0176710 A1* | 7/2011 | Mattiuzzi | G06T 7/0012 382/128 |
| 2021/0358086 A1* | 11/2021 | Jørgensen | A61B 1/000094 |
| 2023/0083161 A1 | 3/2023 | Salameh et al. | |
| 2024/0203567 A1* | 6/2024 | Ruiz | G06T 3/40 |

* cited by examiner

Primary Examiner — Mohamed A. Wasel
(74) Attorney, Agent, or Firm — Caldwell Intellectual Property Law

(57) ABSTRACT

An exemplary apparatus according to this disclosure includes at least a display, a processor, and a memory communicatively connected to the processor. The processor generates a display data structure comprising a plurality of visual elements, configures a display device to display the visual elements, receives an activation of an event handler of the plurality of event handlers, wherein receiving the activation further comprises receiving a user selection of a visual element of the plurality of visual elements that is linked to the event handler, and executes the algorithm module associated with the activated event handler comprising an image processing module configured to receive an initial image and output a modified image.

20 Claims, 6 Drawing Sheets

APPARATUS FOR CONTROL OF IMAGE PROCESSING ALGORITHMS IN A GRAPHICAL INTERFACE

FIELD OF THE INVENTION

The present invention generally relates to the field of image processing. In particular, the present invention is directed to an apparatus and method for control of image processing algorithms in a graphical interface.

BACKGROUND

Image processing related to microscope slides allows users to detect and identify different types of information from digital slide images. It is desirable to create and control a sequence of algorithm modules to perform image processing on slides in real-time without latency effects. However, existing image processing methods are typically run on different cloud networks thereby creating a significant amount of latency.

SUMMARY OF THE DISCLOSURE

In an aspect, an apparatus for control of image processing algorithms in a graphical interface includes at least a processor and a memory communicatively connected to the at least a processor. The memory contains instructions configuring the processor to, generate a display data structure, wherein generating the display data structure further includes providing a plurality of visual elements, linking each of the plurality of visual elements to a respective event handler of a plurality of event handlers, wherein each event handler of the plurality of event handlers is associated with a respective algorithm module of a plurality of algorithm modules, and generating the display data structure using the plurality of visual elements and the plurality of event handlers, configure, using the display data structure, a display device to display the plurality of visual elements, receive, at the display device, an activation of an event handler of the plurality of event handlers, wherein receiving the activation further includes receiving a user selection of a visual element of the plurality of visual elements that is linked to the event handler, and execute the algorithm module associated with the activated event handler wherein executing the algorithm module includes an image processing module, wherein the image processing module is configured to receive an initial image; and output a modified image.

In another aspect, a method for control of image processing algorithms in a graphical interface includes generating a display data structure, wherein generating the display data structure further includes providing a plurality of visual elements, linking each of the plurality of visual elements to a respective event handler of a plurality of event handlers, wherein each event handler of the plurality of event handlers is associated with a respective algorithm module of a plurality of algorithm modules, and generating the display data structure using the plurality of visual elements and the plurality of event handlers, configuring, using the display data structure, a display device to display the plurality of visual elements, receiving, at the display device, an activation of an event handler of the plurality of event handlers, wherein receiving the activation further includes receiving a user selection of a visual element of the plurality of visual elements that is linked to the event handler, and executing the algorithm module associated with the activated event handler wherein executing the algorithm module includes an image processing module, wherein the image processing module is configured to receive an initial image; and output a modified image.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus for control of image processing algorithms in a graphical interface. The apparatus includes at least a computing device comprised of a processor and a memory communicatively connected to the processor. The memory instructs the processor to generate a display data structure, wherein generating the display data structure further includes providing a plurality of visual elements, linking each of the plurality of visual elements to a respective event handler of a plurality of event handlers, wherein each event handler of the plurality of event handlers is associated with a respective algorithm module of a plurality of algorithm modules, and generating the display data structure using the plurality of visual elements and the plurality of event handlers. The processor configures, using the display data structure, a display device to display the plurality of visual elements. Additionally, the processor receives, at the display device, an activation of an event handler of the plurality of event handlers, wherein receiving the activation further includes receiving a user selection of a visual element of the plurality of visual elements that is linked to the event handler. The processor executes the algorithm module associated with the activated event handler wherein executing the algorithm module includes an image processing module, wherein the image processing module is configured to receive an initial image; and output a modified image.

Figure 1:
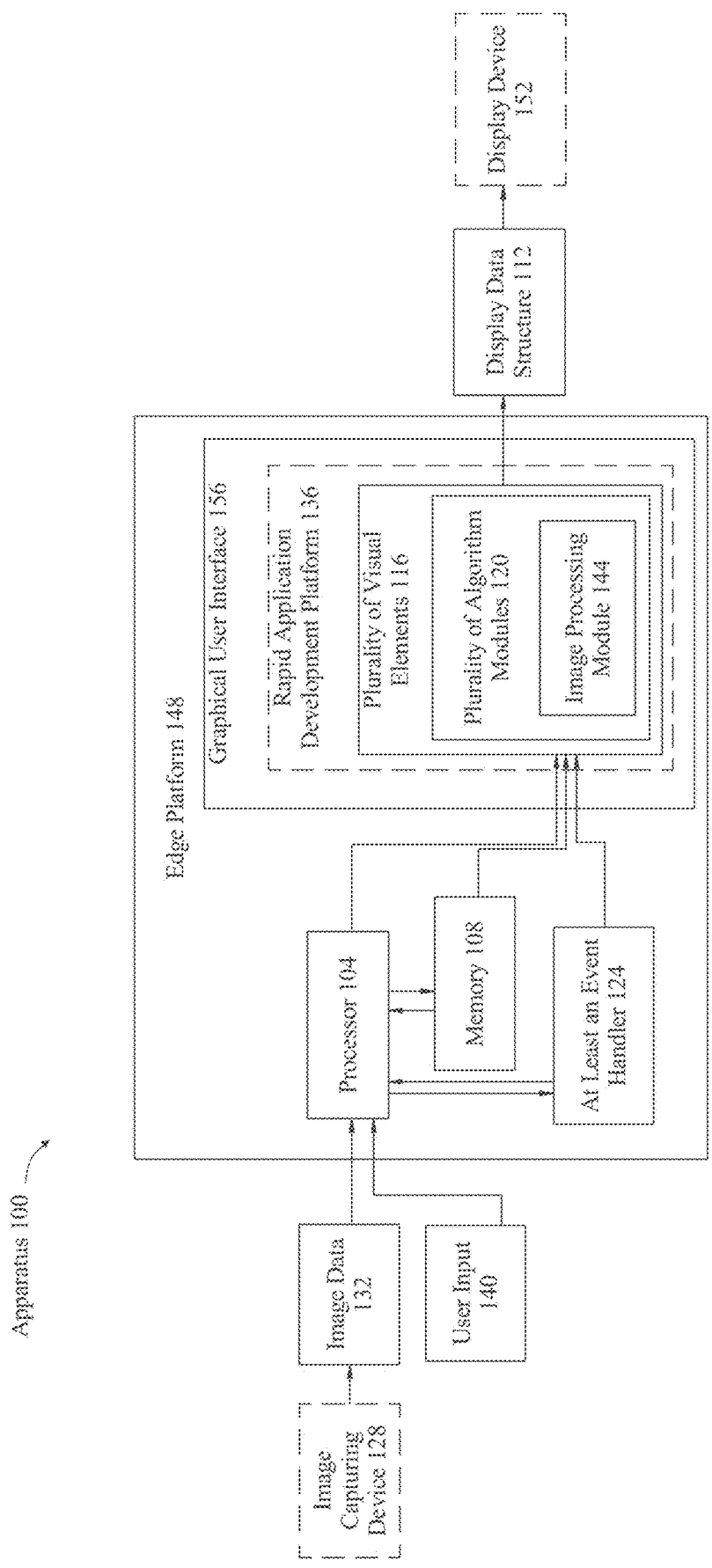
FIG. 1 is a block diagram of an exemplary embodiment of an apparatus for control of image processing algorithms in a graphical interface.

Referring now to FIG. 1, an exemplary embodiment of an apparatus for control of image processing algorithms in a graphical interface is illustrated. Apparatus 100 may include a processor 104 communicatively connected to a memory 108. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 104 is configured to generate display data structure 112, wherein generating display data structure 112 further includes providing plurality of visual elements associated with plurality of algorithm modules 120 and at least an event handler 124. A "display data structure" is a data structure representing a specialized formatting of data on a computer configured such that the information can be effectively presented for a user interface. Display data structure 112 may include vector space, matrix, and the like. A "vector" as defined in this disclosure is a data structure that represents one or more quantitative values and/or measures the position vector. Such vector and/or embedding may include and/or represent an element of a vector space; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where ai is attribute number I of the vector. Scaling and/or normalization may function to make vector comparison independent of absolute quantities of attributes, while preserving any dependency on similarity of attributes. A two-dimensional subspace of a vector space may be defined by any two orthogonal vectors contained within the vector space. Two-dimensional subspace of a vector space may be defined by any two orthogonal and/or linearly independent vectors contained within the vector space; similarly, an n-dimensional space may be defined by n vectors that are linearly independent and/or orthogonal contained within a vector space. A vector's "norm" is a scalar value, denoted $\|\alpha\|$ indicating the vector's length or size, and may be defined, as a non-limiting example, according to a Euclidean norm for an n-dimensional vector a as:

$$\|a\| = \sqrt{\sum_{i=0}^{n} a_i^2}$$

As used in this disclosure "matrix" is a rectangular array or table of numbers, symbols, expressions, vectors, and/or representations arranged in rows and columns. For instance, and without limitation, matrix may include rows and/or columns comprised of vectors representing image data, where each row and/or column is a vector representing a distinct data element of image data; a distinct data element of image data represented by vectors in matrix may include a digitalized image of a slide of cell tissues, including without limitation various aspects of the slide like cell type, cell count, and the like.

Matrix may be generated by performing a singular value decomposition function. As used in this disclosure a "singular value decomposition function" is a factorization of a real and/or complex matrix that generalizes the eigen decomposition of a square normal matrix to any matrix of m rows and n columns via an extension of the polar decomposition. For example, and without limitation singular value decomposition function may decompose a first matrix, A, comprised of m rows and n columns to three other matrices, U, S, T, wherein matrix U, represents left singular vectors consisting of an orthogonal matrix of m rows and m columns, matrix S represents a singular value diagonal matrix of m rows and n columns, and matrix VT represents right singular vectors consisting of an orthogonal matrix of n rows and n columns according to the vectors consisting of an orthogonal matrix of n rows and n columns according to the function:

$$A_{m \times n} = U_{m \times m} S_{m \times n} V_{n \times n}^T$$

singular value decomposition function may find eigenvalues and eigenvectors of $AA^T$ and $A^TA$. The eigenvectors of $A^TA$ may include the columns of VT, wherein the eigenvectors of $AA^T$ may include the columns of U. The singular values in S may be determined as a function of the square roots of eigenvalues $AA^T$ or $A^TA$, wherein the singular values are the diagonal entries of the S matrix and are arranged in descending order. Singular value decomposition may be performed such that a generalized inverse of a non-full rank matrix may be generated.

With continued reference to FIG. 1, as used in this disclosure, a "plurality of visual elements" refer to various graphics a user may interact with in a graphical user interface. Plurality of visual elements 116 may include visual data such as, but not limited to, images, shapes, connecting features, lines, arrows, icons, photographs, infographics, text, any combinations thereof, and the like. Plurality of visual elements 116 may be interacted with via a user through GUI 156 where the user may resize, rotate, reorganize, change the color, and the like. Plurality of visual elements 116 may include connector features that link one visual element to another thereby designating a specific order of execution. In a non-limiting example, user may drag and drop plurality of visual elements 116 from the menu bar of GUI 156 into the user workspace and add arrows connecting one visual element to the next, forming a sequence of events using plurality of visual elements 116.

As used in this disclosure, an "event handler" is a module, data structure, function, and/or routine that performs an action on remote device in response to a user interaction with event handler graphic. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements. As used in this disclosure, an "event" is an action that take place when the user interacts with a component within graphical user interface 156, display device 152, interaction component, and/or any other components/devices that user may interact with. For example, event may include, without limitation, clicking, holding, pressing, tapping, swiping and the like thereof. In some cases, event may include a plurality of actions. In other cases, event may involve other interactive devices such as, without limitation, mouse, keyboard, display, headphone, any other interactive device that either electrically and/or communicatively connected to the computing device, and the like thereof. In a non-limiting example, user may interact with interaction component through performing an event on graphical user interface 156, wherein the event may include user clicking a checkbox present on the visual interface. In some embodiments, event handler may utilize one or more application program interface (API) such as, without limitation, web events and the like thereof. Additionally, or alternatively, event handler may operate any processing step described in this disclosure.

With continued reference to FIG. 1, in some cases, event handler may include a cross-session state variable. As used herein, a "cross-session state variable" is a variable recording plurality of algorithm modules 120 generated by processor 104 during a previous session. Such data may include, for instance, previously entered text, previous selections of one or more plurality of visual elements 116 as described above, or the like. For instance, and without limitation, cross-session state variable data may represent a request (of subset of plurality of algorithm modules 120) a requesting entity initiated in a past session. Cross-session state variable may be saved using any suitable combination of client-side data storage on remote device and edge platform 148 data storage connected to processor 104. In some cases, subset of plurality of algorithm modules 120 and/or plurality of visual elements 116 may be saved wholly or in part as a "cookie" which may include data or an identification of requesting entity to prompt provision of cross-session state variable by processor 104, which may be stored in a data storage at the requesting entity. In a nonlimiting example, a cross-session state variable may include a list of recently created sequences of plurality of visual elements 116, auto recovery settings, custom temples, user specific preferences, and the like. In some cases, cross-session state variable may include at least a prior session datum. A "prior session datum" may include any element of data that may be stored in a cross-session state variable. In an embodiment, graphical user interface 156 may be configured to display the at least a prior session datum, for instance and without limitation auto-populating plurality of visual elements 116 from previous sessions. In a non-limiting example, graphical user interface 156 may include plurality of visual elements 116, plurality of algorithm modules 120, and/or the like. Advantageously, processor 104 may store previous selections of plurality of visual elements 116 such that requesting entity can retrieve a specific plurality of visual elements 116 as desired.

With continued reference to FIG. 1, a "plurality of algorithm modules," as used in this disclosure, is an abstraction of detailed instructions for performing a specific task. Plurality of algorithm modules 120 may include one or more abstracted algorithm daisy chained in an algorithm block. In a non-limiting embodiment, plurality of algorithm modules 120 may include custom algorithms defined by the user, Pramana Nuclei algorithm, the gestalt mitosis algorithm, open source algorithms, and the like. Plurality of algorithm modules 120 may encompass a sequence of user selected and arranged algorithm modules with linking control structures as described below. In a non-limiting example, plurality of algorithm modules 120 may include segmentation algorithms, feature extraction algorithms, classification algorithms, quantitative analysis algorithms, pattern recognition algorithms, registration algorithms, stain separation algorithms, cell detection algorithms, cell tracking algorithms, and/or any combination of algorithms, and the like.

With continued reference to FIG. 1, in a non-limiting example, plurality of algorithm modules 120 may be the same or substantially the same as the algorithm modules described in U.S. patent application Ser. No. 18/226,058, filed on Jul. 25, 2023, titled "IMAGING DEVICE AND A METHOD FOR IMAGE GENERATION OF A SPECIMEN," which is incorporated by reference herein in its entirety. In another non-limiting example, plurality of algorithm modules 120 may be the same or substantially the same as the algorithm modules described in U.S. Pat. App. Ser. No. 63/466,950, filed on May 16, 2023, titled "SYSTEMS AND METHODS FOR INLINE QUALITY CONTROL OF SLIDE DIGITALIZATION," which is incorporated by reference herein in its entirety. In another non-limiting example, plurality of algorithm modules 120 may be the same or substantially the same as the algorithm modules described in U.S. patent application Ser. No. 18/384,840, filed on Oct. 28, 2023, titled "APPARATUS AND METHODS FOR SLIDE IMAGING," which is incorporated by reference herein in its entirety. In another non-limiting example, plurality of algorithm modules 120 may be the same or substantially the same as the algorithm modules described in U.S. patent application Ser. No. 18/382,769, filed on Oct. 23, 2023, titled "SYSTEM AND METHOD OF DIGITALIZING A SLIDE," which is incorporated by reference herein in its entirety. In another non-limiting example, plurality of algorithm modules 120 may be the same or substantially the same as the algorithm modules described in U.S. patent application Ser. No. 18/513,079, filed on Nov. 17, 2023, titled "SYSTEM AND METHODS FOR COLOR GAMUT NORMALIZATION FOR PATHOLOGY SLIDE," which is incorporated by reference herein in its entirety. In another non-limiting example, plurality of algorithm modules 120 may be the same or substantially the same as the algorithm modules described in U.S. patent application Ser. No. 18/428,823, filed on Jan. 31, 2024, titled "SYSTEM AND METHOD FOR VISUALIZATION OF DIGITALIZED SLIDES," which is incorporated by reference herein in its entirety. In another non-limiting example, plurality of algorithm modules 120 may be the same or substantially the same as the algorithm modules described in U.S. patent application Ser. No. 18/227,155, filed on Jul. 27, 2023, titled "METHOD AND AN APPARATUS FOR INLINE IMAGE SCAN ENRICHMENT," which is incorporated by reference herein in its entirety. In another non-limiting example, plurality of algorithm modules 120 may be the same or substantially the same as the algorithm modules described in U.S. patent application Ser. No. 18/217,378, filed on Jun. 30, 2023, titled "APPARATUS AND A METHOD FOR DETECTING ASSOCIATIONS AMONG DATASETS OF DIFFERENT TYPES," which is incorporated by reference herein in its entirety. In another non-limiting example, plurality of algorithm modules 120 may be the same or substantially the same as the algorithm modules described in U.S. Pat. App. Ser. No. 63/463,668, filed on May 3, 2023, titled "SYS- TEMS AND METHODS FOR DETECTION OF PATHOLOGICAL FEATURES DURING SLIDE DIGITIZATION," which is incorporated by reference herein in its entirety. In another non-limiting example, plurality of algorithm modules 120 may be the same or substantially the same as the algorithm modules described in U.S. patent application Ser. No. 18/392,520, filed on Dec. 21, 2023, titled "SYSTEM AND METHODS FOR SLIDE IMAGING," which is incorporated by reference herein in its entirety. In another non-limiting example, plurality of algorithm modules 120 may be the same or substantially the same as the algorithm modules described in U.S. patent application Ser. No. 18/226,017, filed on Jul. 25, 2023, titled "APPARATUS AND A METHOD FOR GENERATING A CONFIDENCE SCORE ASSOCIATED WITH A SCANNED LABEL," which is incorporated by reference herein in its entirety. In another non-limiting example, plurality of algorithm modules 120 may be the same or substantially the same as the algorithm modules described in U.S. Pat. App. Ser. No. 63/508,785, filed on Jun. 21, 2023, titled "SYSTEMS AND METHODS FOR ON-DEMAND REGISTRATION OF WHOLE SLIDE IMAGES," which is incorporated by reference herein in its entirety. In another non-limiting example, plurality of algorithm modules 120 may be the same or substantially the same as the algorithm modules described in U.S. Pat. App. Ser. No. 63/499,432, filed on May 1, 2023, titled "SYSTEMS AND METHODS FOR SCALABLE MACRODISSECTION OF TISSUE FROM SLIDES," which is incorporated by reference herein in its entirety. In another non-limiting example, plurality of algorithm modules 120 may be the same or substantially the same as the algorithm modules described in U.S. Pat. App. Ser. No. 63/465,032, filed on May 9, 2023, titled "SYSTEM AND METHODS FOR DIGITALIZATION OF TISSUE SLIDES BASED ON ASSOCIATIONS AMONG SERIAL SECTIONS," which is incorporated by reference herein in its entirety. In another non-limiting example, plurality of algorithm modules 120 may be the same or substantially the same as the algorithm modules described in U.S. patent application Ser. No. 18/229,812, filed on Aug. 3, 2023, titled "APPARATUS AND METHOD FOR VISUALIZATION OF DIGITIZED GLASS SLIDES BELONGING TO A PATIENT CASE," which is incorporated by reference herein in its entirety.

Still referring to FIG. 1, generating display data structure 112 further includes a first visual element of plurality of visual elements 116 which is linked to a first algorithm module of plurality of algorithm modules 120 and a second visual element of plurality of visual elements is linked to second algorithm module of plurality of algorithm modules 120, wherein the first algorithm module is configured to receive, using an image capturing device 128, a first image as a function of at least an imaging capturing device parameter and execute, using a first control structure, the second algorithm module and the second algorithm module is configured to modify the at least an imaging capturing device parameter as a function of the first image. As used in this disclosure, a "first visual element" is an initially selected element of plurality of visual elements 116. As used in this disclosure, a "first algorithm module" is an algorithm module associated with the first visual element which is included in plurality of algorithm modules 120. As used in this disclosure, a "second visual element" is a subsequently selected element of plurality of visual elements 116 which comes after a first visual element. As used in this disclosure, a "second algorithm module" is an algorithm module associated with the second visual element which is included in plurality of algorithm modules 120.

As used in this disclosure, an "image capturing device" is a device that is designed to create a digitalized visual of a real life element. Image capturing device 128 may include, and is not limited to, an optical scanner, a video capture device (e.g., a still camera, a video camera), and any combinations thereof. In a non-limiting embodiment, image capturing device 128 may include the use of a Pramana scanner to digitalize a pathology slide image wherein processor 104 may receive the digitalized pathology slide image via the Pramana scanner.

With continued reference to FIG. 1, "image data" is information related to a visual image. Image data 132 may include various pieces of information related to the content of an image. In a non-limiting embodiment, image data 132 may include a plurality of image properties such as pixel data, color data, resolution data, format, and the like. Image data 132 may include meta data such as identification numbers and/or block identification numbers corresponding to image data 132 and quality data such as, but not limited to, debris, faintness, focus errors, stitching errors, and the like.

With continued reference to FIG. 1, as used in this disclosure, a "first image" is a digital image that is initially taken using image capturing device 128 initial parameters. The first image is used to further tune and/or adjust image capturing device 128 parameters to focus on a desired aspect of the image. In a non-limiting example, first image might capture Slide Level details of skin tissue which may include certain features and/or characteristics that may provide insight into the health and condition of the cells. Based on the identification of the structures viewable from Slide Level, image capturing device 128 may receive this information and change scan paraments to further investigate the identified structures using, for example, and without limitation, a slide magnified to Grid Level. As used in this disclosure, a "first control structure" is a linking feature that associates the first algorithm module to the second algorithm module and directs the flow of plurality of algorithm modules 120 as defined in more detail below. As used in this disclosure, a "second image" is a digital image that is taken after the parameters of image capturing device 128 have been modified based on first image information. Modification of image capturing device 128 parameters may include changing the magnification, the focus, exposure settings, light source intensity, color balance, resolution, scan speed, and the like as discussed herein.

With continued reference to FIG. 1, as used in this disclosure, an "image capturing device parameter" is a characteristic associated with a device used to capture images that affects the quality, resolution, and/or functionality of the captured image. In a non-limiting disclosure, image capturing device 128 may include parameters such as, and without limitation, resolution, color depth, image capturing area, speed of image capture, color mode, color balancing, focus, exposure, and the like.

With continued reference to FIG. 1, the at least an image capturing device parameter may configure image capturing device 128 to operate at one or more of a slide level, a grid level, and a field of view level. As used in this disclosure, a "slide" refers to a flat, transparent material in which specimen are observed under a microscope. As used in this disclosure, a "slide level" refers to an entire sample and/or specimen on a slide. Slide level provides a macroscopic view of the specimen and is typically used for initial inspection and/or characterization. As used in this disclosure, a "grid level" refers to a smaller region or grid of slide level that often provides a more detailed view of the specimen. As used in this disclosure, a "field of view (FoV) level" refers to an individual aspect within grid level and usually involves high magnification of specific areas of grid level to capture more minute elements. In a non-limiting example, image data 132 components may be characterized based on composition while being imaged to generate a Whole Slide Image (WSI). In this example, at the smallest level is the FoV level where a first set of visual elements associated with plurality of algorithm modules 120 can be daisy chained to run for each FoV level. The results can be consolidated and passed to the next level of composition, which is the grid level. A separate set of visual elements associated with plurality of algorithm modules 120 can be run for each grid level separately. The results across multiple grid levels that form the slide may be aggregated and passed to slide level daisy chained plurality of algorithm modules 120. In another embodiment, the results of slides belonging to a specific patient case can be aggregated and sent to another daisy chained plurality of algorithm modules 120.

With continued reference to FIG. 1, wherein the first control structure may be further configured to evaluate at least a condition and selectively execute the second algorithm module as a function of the at least a condition. As used in this disclosure, a "condition" is a control structure used to direct the flow of algorithm execution. A condition has two potential outcomes: true or false. A condition may or may not execute a series of algorithm modules depending on the outcome and how the user defined the system. A condition may include one or more control structures to check for certain parameters. Without limitation, a condition may include first control structure, second control structure, and the like. A condition may be built from various types of operators including, but not limited to, strings (e.g., words), Boolean (e.g., true/false statements), arrays and/or lists (e.g., comma separated lists), integers (e.g., whole numbers), and/or floats (e.g., a decimal number). In a non-limiting example, plurality of algorithm modules 120 may include one or more processing modules 144 linked using one or more conditions. In another non-limiting example, a condition may determine the flow of plurality of algorithm modules 120 execution using an "if-then" statement where if the first set of visual elements identify "X" type of cells in a slide image, to then execute a second set of visual elements to further identify "Y" characteristic of "X" type of cells. A condition may include a loop statements, break statements, continue statements, and/or pass statements. A loop statement is a control structure that allow an algorithm module to be executed repeatedly based on a specific condition or assigned value for number of iterations. A break statement is a control structure that terminates a loop statement prematurely if a particular event occurs based on the predefined condition. A continue statement is a control structure typically used with loop statements that skips remaining code in the iteration of a loop and advances to the next iteration.

With continued reference to FIG. 1, a third visual element of the plurality of visual elements is linked to a third algorithm module of the plurality of algorithm modules, the second algorithm module is further configured to execute, using a second control structure, the third algorithm module, and the third algorithm module is configured to receive, using the image capturing device, a second image as a function of the at least a modified image capturing device parameter. As used in this disclosure, a "third visual element" is a subsequently selected visual element of plurality of visual elements 116 which comes after the second visual element. As used in this disclosure, a "third algorithm module" is an algorithm module associated with the third visual element which is included in plurality of algorithm modules 120. In a non-limiting example, the second algorithm module may include an algorithm to find "X" kind of cells in the first image captured by image capturing device 128, linked by the second control structure which is conditioned to run third algorithm module if "X" kind of cells are observed, wherein the third algorithm module may include an algorithm to zoom into "X" cells at a higher magnification thereby producing the second image as a function of the at least a modified image capturing device parameters, wherein the modified parameter is the increased magnification of the image capturing device.

Still referring to FIG. 1, processor 104 generates display data structure 112 using plurality of visual elements 116 and at least an event handler 124. In a non-limiting example, plurality of visual elements 116 may be associated to at least an event handler 124 and combined to create display data structure 112.

With continued reference to FIG. 1, processor 104 may provide plurality of visual elements 116 associated with plurality of algorithm modules 120 and at least an at least an event handler 124, further includes receiving the first algorithm module as a function of rapid application development platform 136. As used in this disclosure, a "rapid application development (RAD) platform" is a software platform that enables user to create applications with little to no coding through the use of pre-built components in a visual interface. RAD platform 136 may include a zero-code or a low-code platform, and the like. As used in this disclosure, a "zero-code platform" is a software development platform that allows users to instantiate an application using visual components instead of traditional code. Zero-code platforms help to facilitate the development of applications by bypassing the traditional code development process thereby saving money, resources, and time. Zero-code platforms use a practical user interface layer designed to provide users with visual elements to construct an application, which enables more users to quickly develop applications using the platform. In a non-limiting example, zero-code platform may include Webflow, Bubble, Adalo, and the like. Similar to a zero-code platform, a low-code platform is a software development platform that allows users to create applications with minimal coding expertise required. Low code-platforms rely on a combination of pre-built components and some level of traditional scripting for specific tasks. A low-code platform provides more flexibility than zero-code platforms because it allows a user to incorporate traditional coding techniques to modify pre-built components. Low-code platforms typically facilitate the development of applications by providing an interface with visual design components and capabilities to integrate custom code to empower varying levels of technical expertise while simultaneously reducing time and resources required for traditional application development. In a non-limiting example, low-code platforms may include Mendix, OutSystems, Appian, and the like.

With continued reference to FIG. 1, processor 104 may be further configured to receive, at display device 136, an activation of at least an event handler 124, wherein receiving the activation further includes receiving user input 140 of at least a visual element of plurality of visual elements 116 that is linked to at least an event handler 124 and execute at least an algorithm module associated with the at least an activated event handler wherein executing the at least an algorithm module includes image processing module 144, wherein image processing module 144 is configured to receive, using image capturing device 128, at least an initial image, process, using image processing module 144, at least a modified image as a function of the at least an initial image, and output the at least a modified image. As used in this disclosure, an "activation of at least an event handler" refers to an action that triggers an event handler to perform a specific function. In a non-limited embodiment, an activation of an event handler may include user input. A "user input," as described herein, is specific data or configurations of data that a user defines using graphical user interface 156. User input 140 may include image data 132, plurality of visual elements 116, plurality of algorithm modules 120, and the like. In a non-limiting example, user input 140 may include selecting and dragging plurality of visual elements 116 that are associated with plurality of algorithm modules 120 into graphical user interface 156 window and arranging one or more plurality of algorithm modules 120 in a precise sequence of steps to achieve a desired outcome.

As used in this disclosure, an "image processing module" is a component designed to process digital images. For example, and without limitation, image processing, module may be configured to compile plurality of images of a multi-layer scan to create an integrated image. In an embodiment, image processing module 144 may include a plurality of software algorithms that can analyze, manipulate, or otherwise enhance an image, such as, without limitation, a plurality of image processing techniques as described below. In another embodiment, image processing module 144 may slow include hardware components such as, without limitation, one or more graphics processing units (GPUs) that can accelerate the processing of large number of images. In some cases, image processing module 144 may be implemented with one or more image processing libraries such as, without limitation, OpenCV, PIL/Pillow, ImageMagick, and the like. Image processing module 144 may include, be included in, or be communicatively connected to image capturing device 128, processor 104, and/or memory 108. Image processing module 144 may include, but is not limited to, image enhancement and restoration, segmentation of features based on an area of interest, registration and fusion of multimodality images, classification of image features through structure characterization, quantitative measurement of image features, any combination thereof, and the like. Image processing module 144 may include any image processing technique used across various fields including, but not limited to, healthcare, remote sensing, surveillance, entertainment, robotics, and the like.

With continued reference to FIG. 1, image processing module 144 may be configured to receive images from processor 104 and/or any other input methods as described herein. In a non-limiting example, image processing module 144 may be configured to receive images by generating a first image capture parameter, transmitting a command to image capturing device 128 to take first image of a plurality of images with the first image capture parameter, generate a second image capture parameter, transmit a command to image capturing device 128 to take second image of a plurality of images with the second image capture parameter, and receive, from image capturing device 128, first image and second image. In another non-limiting example, plurality of images may be taken by image capturing device 128 using the same image capture parameter. Image capture parameter may be generated as a function of user input 140 or processor 104.

With continued reference to FIG. 1, plurality of images from image data 132 may be transmitted from processor 104 to image processing module 144 via any suitable electronic communication protocol, including without limitation packet-based protocols such as transfer control protocolinternet protocol (TCP-IP), file transfer protocol (FTP) or the like. Receiving images may include retrieval of images from a data store containing images as described below; for instance, and without limitation, images may be retrieved using a query that specifies a timestamp that images may be required to match.

With continued reference to FIG. 1, image processing module 144 may be configured to process images. In an embodiment, image processing module 144 may be configured to compress and/or encode images to reduce the file size and storage requirements while maintaining the essential visual information needed for further processing steps as described below. In an embodiment, compression and/or encoding of plurality of images may facilitate faster transmission of images. In some cases, image processing module 144 may be configured to perform a lossless compression on images, wherein the lossless compression may maintain the original image quality of images. In a nonlimiting example, image processing module 144 may utilize one or more lossless compression algorithms, such as, without limitation, Huffman coding, Lempel-Ziv-Welch (LZW), Run-Length Encoding (RLE), and/or the like to identify and remove redundancy in each image in a plurality of images without losing any information. In such embodiment, compressing and/or encoding each image of a plurality of images may include converting the file format of each image into PNG, GIF, lossless JPEG2000 or the like. In an embodiment, images compressed via lossless compression may be perfectly reconstructed to the original form (e.g., original image resolution, dimension, color representation, format, and the like) of images. In other cases, image processing module 144 may be configured to perform a lossy compression on plurality of images, wherein the lossy compression may sacrifice some image quality of images to achieve higher compression ratios. In a non-limiting example, image processing module 144 may utilize one or more lossy compression algorithms, such as, without limitation, Discrete Cosine Transform (DCT) in JPEG or Wavelet Transform in JPEG2000, discard some less significant information within images, resulting in a smaller file size but a slight loss of image quality of images. In such embodiment, compressing and/or encoding each image of a plurality of images may include converting the file format of each image into JPEG, WebP, lossy JPEG2000, or the like.

With continued reference to FIG. 1, in an embodiment, processing images may include determining a degree of quality of depiction of a region of interest of an image or a plurality of images. In an embodiment, image processing module 144 may determine a degree of blurriness of images. In a non-limiting example, image processing module 144 may perform a blur detection by taking a Fourier transform, or an approximation such as a Fast Fourier Transform (FFT) of images and analyzing a distribution of low and high frequencies in the resulting frequency-domain depiction of images; for instance, and without limitation, numbers of high-frequency values below a threshold level may indicate blurriness. In another non-limiting example, detection of blurriness may be performed by convolving images, a channel of images, or the like with a Laplacian kernel; for instance, and without limitation, this may generate a numerical score reflecting a number of rapid changes in intensity shown in each image, such that a high score indicates clarity, and a low score indicates blurriness. In some cases, blurriness detection may be performed using a Gradient-based operator, which measures operators based on the gradient or first derivative of images, based on the hypothesis that rapid changes indicate sharp edges in the image, and thus are indicative of a lower degree of blurriness. In some cases, blur detection may be performed using Wavelet-based operator, which takes advantage of the capability of coefficients of the discrete wavelet transform to describe the frequency and spatial content of images. In some cases, blur detection may be performed using statistics-based operators take advantage of several image statistics as texture descriptors in order to compute a focus level. In other cases, blur detection may be performed by using discrete cosine transform (DCT) coefficients in order to compute a focus level of images from its frequency content. Additionally, or alternatively, image processing module 144 may be configured to rank images according to degree of quality of depiction of a region of interest and select a highest-ranking image from a plurality of images.

With continued reference to FIG. 1, processing images may include enhancing at least a region of interest via a plurality of image processing techniques to improve the quality (or degree of quality of depiction) of an image for better processing and analysis as described further in this disclosure. In an embodiment, image processing module 144 may be configured to perform a noise reduction operation on an image, wherein the noise reduction operation may remove or minimize noise (arises from various sources, such as sensor limitations, poor lighting conditions, image compression, and/or the like), resulting in a cleaner and more visually coherent image. In some cases, noise reduction operation may be performed using one or more image filters; for instance, and without limitation, noise reduction operation may include Gaussian filtering, median filtering, bilateral filtering, and/or the like. Noise reduction operation may be done by image processing module 144, by averaging or filtering out pixel values in neighborhood of each pixel of an image to reduce random variations.

With continued reference to FIG. 1, in another embodiment, image processing module 144 may be configured to perform a contrast enhancement operation on an image. In some cases, an image may exhibit low contrast, which may, for example, make a feature difficult to distinguish from the background. Contrast enhancement operation may improve the contrast of an image by stretching the intensity range of the image and/or redistributing the intensity values (i.e., degree of brightness or darkness of a pixel in the image). In a non-limiting example, intensity value may represent the gray level or color of each pixel, scale from 0 to 255 in intensity range for an 8-bit image, and scale from 0 to 16,777,215 in a 24-bit color image. In some cases, contrast enhancement operation may include, without limitation, histogram equalization, adaptive histogram equalization (CLAHE), contrast stretching, and/or the like. image processing module 144 may be configured to adjust the brightness and darkness levels within an image to make a feature more distinguishable (i.e., increase degree of quality of depiction). Additionally, or alternatively, image processing module 144 may be configured to perform a brightness normalization operation to correct variations in lighting conditions (i.e., uneven brightness levels). In some cases, an image may include a consistent brightness level across a region after brightness normalization operation performed by image processing module 144. In a non-limiting example, image processing module 144 may perform a global or local mean normalization, where the average intensity value of an entire image or region of an image may be calculated and used to adjust the brightness levels.

With continued reference to FIG. 1, in other embodiments, image processing module 144 may be configured to perform a color space conversion operation to increase degree of quality of depiction. In a non-limiting example, in case of a color image (i.e., RGB image), image processing module 144 may be configured to convert RGB image to grayscale or HSV color space. Such conversion may emphasize the differences in intensity values between a region or feature of interest and the background. Image processing module 144 may further be configured to perform an image sharpening operation such as, without limitation, unsharp masking, Laplacian sharpening, high-pass filtering, and/or the like. Image processing module 144 may use image sharpening operation to enhance the edges and fine details related to a region or feature of interest within an image by emphasizing high-frequency components within an image.

With continued reference to FIG. 1, processing images may include isolating a region or feature of interest from the rest of an image as a function of plurality of image processing techniques. Images may include highest-ranking image selected by image processing module 144 as described above. In an embodiment, plurality of image processing techniques may include one or more morphological operations, wherein the morphological operations are techniques developed based on set theory, lattice theory, topology, and random functions used for processing geometrical structures using a structuring element. A "structuring element," for the purpose of this disclosure, is a small matrix or kernel that defines a shape and size of a morphological operation. In some cases, structing element may be centered at each pixel of an image and used to determine an output pixel value for that location. In a non-limiting example, isolating a region or feature of interest from an image may include applying a dilation operation, wherein the dilation operation is a basic morphological operation configured to expand or grow the boundaries of objects (e.g., a cell, a dust particle, and the like) in an image. In another non-limiting example, isolating a region or feature of interest from an image may include applying an erosion operation, wherein the erosion operation is a basic morphological operation configured to shrink or erode the boundaries of objects in an image. In another non-limiting example, isolating a region or feature of interest from an image may include applying an opening operation, wherein the opening operation is a basic morphological operation configured to remove small objects or thin structures from an image while preserving larger structures. In a further non-limiting example, isolating a region or feature of interest from an image may include applying a closing operation, wherein the closing operation is a basic morphological operation configured to fill in small gaps or holes in objects in an image while preserving the overall shape and size of the objects. These morphological operations may be performed by image processing module 144 to enhance the edges of objects, remove noise, or fill gaps in a region or feature of interest before further processing.

With continued reference to FIG. 1, in an embodiment, isolating a region or feature of interest from an image may include utilizing an edge detection technique, which may detect one or more shapes defined by edges. An "edge detection technique," as used in this disclosure, includes a mathematical method that identifies points in a digital image, at which the image brightness changes sharply and/or has a discontinuity. In an embodiment, such points may be organized into straight and/or curved line segments, which may be referred to as "edges." Edge detection technique may be performed by image processing module 144, using any suitable edge detection algorithm, including without limitation Canny edge detection, Sobel operator edge detection, Prewitt operator edge detection, Laplacian operator edge detection, and/or Differential edge detection. Edge detection technique may include phase congruency-based edge detection, which finds all locations of an image where all sinusoids in the frequency domain, for instance as generated using a Fourier decomposition, may have matching phases which may indicate a location of an edge. Edge detection technique may be used to detect a shape of a feature of interest such as a cell, indicating a cell membrane or wall; in an embodiment, edge detection technique may be used to find closed figures formed by edges.

Referring to FIG. 1, in a non-limiting example, identifying one or more features from image data 132 may include isolating one or more areas of interests using one or more edge detection techniques. An area of interest may include a specific area within a digital image that contains information relevant to further processing, such as one or more image features. In a non-limiting example, image data located outside an area of interest may include irrelevant or extraneous information. Such portion of image data 132 containing irrelevant or extraneous information may be disregarded by image processing module 144, thereby allowing resources to be concentrated at a targeted area of interest. In some cases, the area of interest may vary in size, shape, and/or location within image data 132. In a non-limiting example the area of interest may be presented as a circle around the nucleus of a cell. In some cases, the area of interest may specify one or more coordinates, distances, and the like, such as center and radius of a circle around the nucleus of a cell in an image. Image processing module 144 may then be configured to isolate the area of interest from image data 132 based on the particular feature. In a non-limiting example, image processing module 144 may crop an image according to a bounding box around an area of interest.

With continued reference to FIG. 1, image processing module 144 may be configured to perform a connected component analysis (CCA) on an image for feature of interest isolation. As used in this disclosure, a "connected component analysis (CCA)," also known as connected component labeling, is an image processing technique used to identify and label connected regions within a binary image (i.e., an image which each pixel having only two possible values: 0 or 1, black or white, or foreground and background). "Connected regions," as described herein, is a group of adjacent pixels that share the same value and are connected based on a predefined neighborhood system such as, without limitation, 4-connected or 8-connected neighborhoods. In some cases, image processing module 144 may convert an image into a binary image via a thresholding process, wherein the thresholding process may involve setting a threshold value that separates the pixels of an image corresponding to feature of interest (foreground) from those corresponding to the background. Pixels with intensity values above the threshold may be set to 1 (white) and those below the threshold may be set to 0 (black). In an embodiment, CCA may be employed to detect and extract feature of interest by identifying a plurality of connected regions that exhibit specific properties or characteristics of the feature of interest. image processing module 144 may then filter plurality of connected regions by analyzing plurality of connected regions properties such as, without limitation, area, aspect ratio, height, width, perimeter, and/or the like. In a non-limiting example, connected components that closely resemble the dimensions and aspect ratio of feature of interest may be retained, by image processing module 144 as feature of interest, while other components may be discarded. Image processing module 144 may be further configured to extract feature of interest from an image for further processing.

With continued reference to FIG. 1, an "initial image" is a digital image in its original form that is not modified. The initial image may include any image received from image capturing device 128 and/or user input 140. In a non-limiting example, the initial image may include an unmodified scan slide image of skin tissue taken from image capturing device 128. With continued reference to FIG. 1, a "modified image" is a digital post-processed image. The modified image may include any image that is processed by plurality of algorithm modules 120. The modified image may include any image subject to image processing module 144. In a non-limiting example, the modified image may include a scan slide image of skin tissue from image capturing device 128 that plurality of algorithm modules 120 output, wherein plurality of algorithm modules 120 used image processing module 144 to reduce noise in the slide image, enhance the quality of the slide image, and the like as discussed above.

With continued reference to FIG. 1, at least an event handler 124 may be configured to respond to user input 140 and execute asynchronous tasks. At least an event handler 124 may be configured to respond to user input 140 by executing specific actions when an event is triggered as described above. In a non-limiting example, event handler may open a new session or run plurality of algorithm modules 120 when user input 140 clicks on the plus sign icon in the top corner of graphical user interface 156, or the play button icon in the bottom corner of graphical user interface 156, respectively. As used in this disclosure an "asynchronous task" is a task that can be initiated in response to an event without interfering with execution of subsequent code. In non-limiting example, at least an event handler 124 may execute an asynchronous task when receiving plurality of visual elements 116 while simultaneously in the background executing image processing module 144 which may involve loading image data 132, filtering and/or transforming image data 132, analyzing image data 132, and the like.

With continued reference to FIG. 1, plurality of visual elements 116 comprises a plurality of widgets, wherein the plurality of widgets comprises a component to modify scan acquisition parameters, a component to drag and drop plurality of algorithm modules 120 and the control structures, and a component to probe the sequence in specified locations. A "widget," as used herein, is a user control element that allows a user to control and change the appearance of elements in the user interface. In this context a plurality of widgets may refer to a generic GUI element such as a check box, button, or scroll bar to an instance of that element, or to a customized collection of such elements used for a specific function or application (such as a dialog box for users to customize their computer screen appearances). Graphical user interface 156 controls may include software components that a user interacts with through direct manipulation to read or edit information displayed through graphical user interface 156. A plurality of widgets may be used to display lists of related items, navigate the system using links, tabs, and manipulate data using check boxes, radio boxes, and the like. For example, a widget may include a graphical component, or button, that a user can click to drag and drop plurality of algorithm modules 120 into the window of graphical user interface 156. A widget may also include, without limitation, a component that allows users to set various parameters for the image capturing device 128.

For instance, without limitation, functions of the widget may include modifying acquisition parameters, changing scanner behavior, adjusting multi-magnification selections, updating choices on fusion, changing image modalities, changes in quality control thresholds, changing color profile selections, and the like. Plurality of visual elements 116 may also include a visualization window. As used in this disclosure, a "visualization window" is a window where a user can run the sequence of plurality of algorithm modules 120 and probe the output at certain locations of the sequence. This function enables a user to obtain real-time feedback on their sequence model at certain parts of the chain. As used in this disclosure, a "probe" is a widget where the user can drop into the visualization window at and receive a return output. The probe may be depicted as an arrow, or any other shape, to identify the location of the algorithm module sequence that the user would like to obtain an output. For instance, and without limitation, the user may probe the sequence model containing six algorithm modules at the third algorithm module to obtain the output generated by the first three algorithm modules.

With continued reference to FIG. 1, processor 104 may be further configured to execute the at least an algorithm module as a function of edge platform 148, wherein edge platform 148 is configured to reduce computational latency by processing data closer to the source of data generation. As used in this disclosure, an "edge platform" is a computing platform that processes and stores data closer to the source of data generation which enables faster processing speeds. Edge platform 148 may include a router, internet service provider (ISP), routing switches, integrated access devices (IADs), multiplexers, and the like. Edge platform 148 may refer to any computing model that brings the computations physically closer to the user to reduce latency effects. Edge platform 156 may occur outside the cloud and instead on servers that are located closer to the user.

With continued reference to FIG. 1, edge platform 148 may receive image data 132 from image capturing device 128, process plurality of algorithm modules 120, provide real-time feedback, and store plurality of algorithm modules 120 on a locally cached system. In a non-limiting example, edge platform 148 may provide real-time feedback in the form of a pop-up dialogue box, notification to a messenger panel, in app notifications, sound alerts, visual alerts, and the like. The real-time feedback may include flagging where an error occurs in the algorithm module and a brief description of why the error has occurred as discussed below. Additionally or alternatively, the real-time feedback may include feedback regarding adjusting scan parameters, or information regarding image data 132. In a non-limiting example, the real-time feedback may include tagging a skin tissue slide with possible diagnosis' from healthy cells, or abnormal skin cells and needing to further check the diagnosis through magnifying the slide image to Grid Level and enhancing image capturing device 128 parameters to capture the areas and/or cells of interest. Plurality of algorithm modules 120 may be stored on edge platform 148 to reduce latency issues through minimized transmission times between the client device and the server. As used in this disclosure, "client device" is a device that accesses and interacts with apparatus 100. For instance, and without limitation, client device may include a remote device and/or apparatus 100. In a non-limiting embodiment, client device may be consistent with a computing device as described in the entirety of this disclosure. Storing plurality of algorithm modules 120 on edge platform 148 also permits the user to re-open and rework a previous design to model more complex tasks or use an existing template and change certain parameters for future use cases.

With continued reference to FIG. 1, processor 104 may be further configured to execute the at least an algorithm module including verifying the at least an algorithm module, identifying an algorithm error, and indicating an algorithm correction. As used in this disclosure, an "algorithm error" is a mistake or flaw in the design or implementation of an algorithm that results in an improperly executed algorithm or unintended algorithm behavior. An algorithm error may include one or more errors within an algorithm. In a non-limiting example, algorithm error may include infinite loops, logic errors, inefficient algorithms, boundary condition errors, and the like. As used in this disclosure, an "algorithm correction" is a possible solution or multiple solutions to correct an algorithm error. An algorithm correction may be delivered to user through the graphical user interface 156 in the form of a notification as previously described. Algorithm correction may include various solutions such as, but not limited to, version control, data validation, and other error handling mechanisms. In a non-limiting example, an algorithm correction such as version control, may allow a user to recover an earlier version of the workspace that was created before the introduction of the algorithm error.

With continued reference to FIG. 1, processor 104 may indicate the algorithm correction is a function of at least an event handler 124, wherein at least an event handler 124 may include transmitting an error notification using graphical user interface 156 and transmitting a solution to the error using graphical user interface 156. As used in this disclosure, an "error notification" is an algorithm error that is delivered to a user through graphical interface 156 in the form of a notification as described above. An error notification may use text and/or image data to convey the error information to the user. An error notification may comprise one or more notifications to the user. In a non-limiting example, error notification may include a pop-up window on graphical user interface 156 that alerts the user that a specific algorithm module has an improper boundary condition and the error notification may include highlighting the specific plurality of visual elements 116 that is the cause of such error. At least an event handler 124 may provide one or more possible solutions to overcome an error. In a non-limited example, at least an event handler 124 may transmit one or more possible solutions to overcome an error through another pop-up window in graphical user interface 156. User may select one of the solutions to implement by clicking the pop-up window element that suggests the desired solution.

Still referring to FIG. 1, processor 104 configures, using display data structure 112, display device 152, to display the data structure. A "display device" for the purposes of this disclosure is a device configured to show visual information. In some cases, display device 152 may include a liquid crystal display (LCD), a cathode ray tube (CRT), a plasma display, a light emitting diode (LED) display, and any combinations thereof. Display device 152 may include, but is not limited to, a smartphone, tablet, laptop, monitor, tablet, and the like. Display device 152 may include a separate device that includes a transparent screen configured to display computer generated images and/or information. In some cases, display device 152 may be configured to present a graphical user interface to a user, wherein a user may interact with a GUI. In some cases, a user may view a graphical user interface through display. As used in this disclosure, a "graphical user interface (GUI)" is a graphical form of user interface that allows users to interact with electronic devices. In some embodiments, GUI 156 may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 156. For example, links to decentralized platforms as described in this disclosure may be incorporated using icons. Using an icon may be a fast way to open documents, run programs etc. because clicking on them yields instant access. Processor 104 may be configured to transmit the display data structure 112 to a graphical user interface 156. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. Processor 104 may transmit the data described herein to an edge platform database wherein the data may be accessed from the edge platform database, as discussed in more detail below. Processor 104 may further transmit the data herein to a device display or another computing device. Persons skilled in the art, upon reviewing the entirety of this disclosure, will be aware of various ways in which a graphical user interface and/or elements thereof may be implemented and/or used as described in this disclosure.

Figure 2:
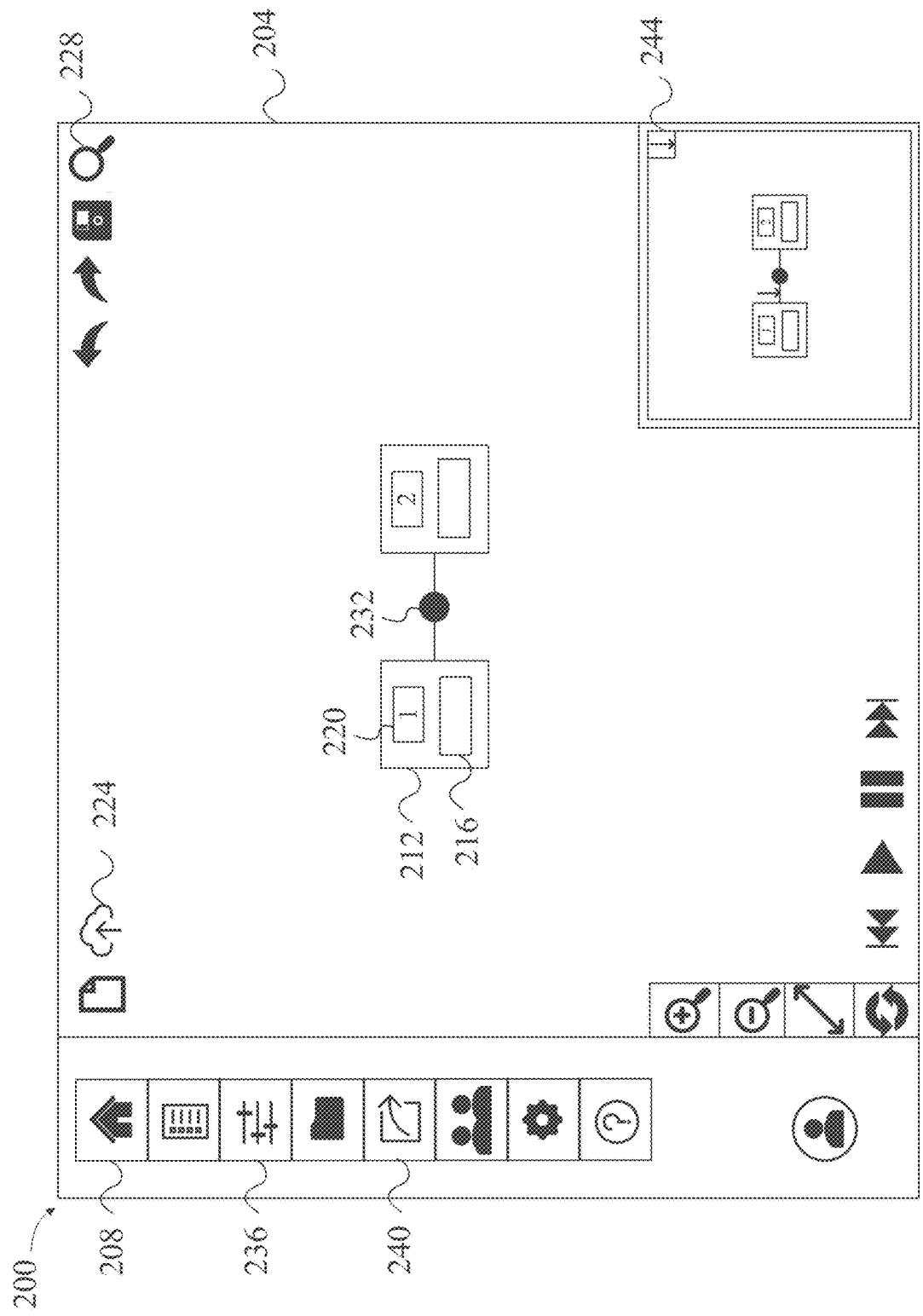
FIG. 2 is an exemplary embodiment of a graphical user interface in accordance with this disclosure.

Referring now to FIG. 2, an exemplary embodiment of graphical user interface 200 is described in accordance with this disclosure. In some cases, graphical user interface 200 includes window 204. A "window" for the purposes of this disclosure is the information that is capable of being displayed within a border of device display. A user may navigate through different windows 204 wherein each window 204 may contain new or differing information or data. For example, a first window 204 may display information relating to user data wherein a user may be requested to input user data such as a username and password, whereas a second window may display information relating to the algorithm modules. A user may navigate through a first second, third and fourth window (and so on) by interacting with graphical user interface. For example, a user may select a button or a box signifying a next window on graphical user interface 200, wherein the pressing of the button may navigate a user to another window 204. In some cases, graphical user interface 200 may further contain event handlers, wherein the placement of text within a textbox may signify to computing device to display another window. In some cases, graphical user interface may include navigation components 208 wherein selection of a navigation component may direct a user to another window 204. For example, a user may select a 'back arrow' to undo an action immediately taken by user. In another non limiting example, a user may select the "Save" navigation component 208 wherein a user may save their current instance of the workspace. In some cases, graphical user interface 200 may contain modules 212 wherein the modules may contain one or more components such as image processing modules as described in this disclosure. In some cases, modules 212 may be consistent with image processing modules as described above. In some cases, each module 212 may contain a display element 216. The display element 216 may be configured to display graphical icons, images and the like that may be used to describe module 212. For example, display element 216 may contain an image of a cell with a particular color and/or pattern wherein a user may deduce that the module is associated with a particular type of cell with a particular color and/or pattern. In some cases, module may further include a descriptor 220 wherein the descriptor may be used to describe the particular module 212. In some cases, each module may be associated with one or more even handlers wherein selection of a module 212 may signify to computing device that one or more actions should take place, such as the receiving of data. In some cases, a user may opt to inset their own module through an upload feature 224 wherein the upload feature 224 may allow a user to input or select modules that are not displayed on graphical user interface. In some cases, a user may search through modules 220 using magnifying icon 228 wherein a user may input descriptive information to retrieve one or more modules. For example, a user may search "Cell Counting Algorithm" wherein computing device may be configured to retrieve a module 212 associated with a cell counting algorithm. In some cases graphical user interface may further include a control structure 232 wherein the control structure 232 may provide control the flow of module 212.

With continued reference to FIG. 2, in some cases, graphical user interface 200 includes a widget for setting acquisition parameters, 236. For example, a user may select the widget for setting acquisition parameters 236, to modify scanner parameters, such as, without limitation, scanner behavior, for multi-magnification selection, for choices on fusion, for change of imaging modality, for changes in quality control thresholds, for color profile selection, and the like. In some cases, graphical user interface 200 includes a component, 240, to drag and drop modules 212 into the window 204 and enable users to link modules 212 using control structures 232. In some cases, graphical user interface 200 includes a visualization window, 244, where users can drop probes anywhere in the daisy chain to see the output at that specifically identified location in the chain.

Figure 3:
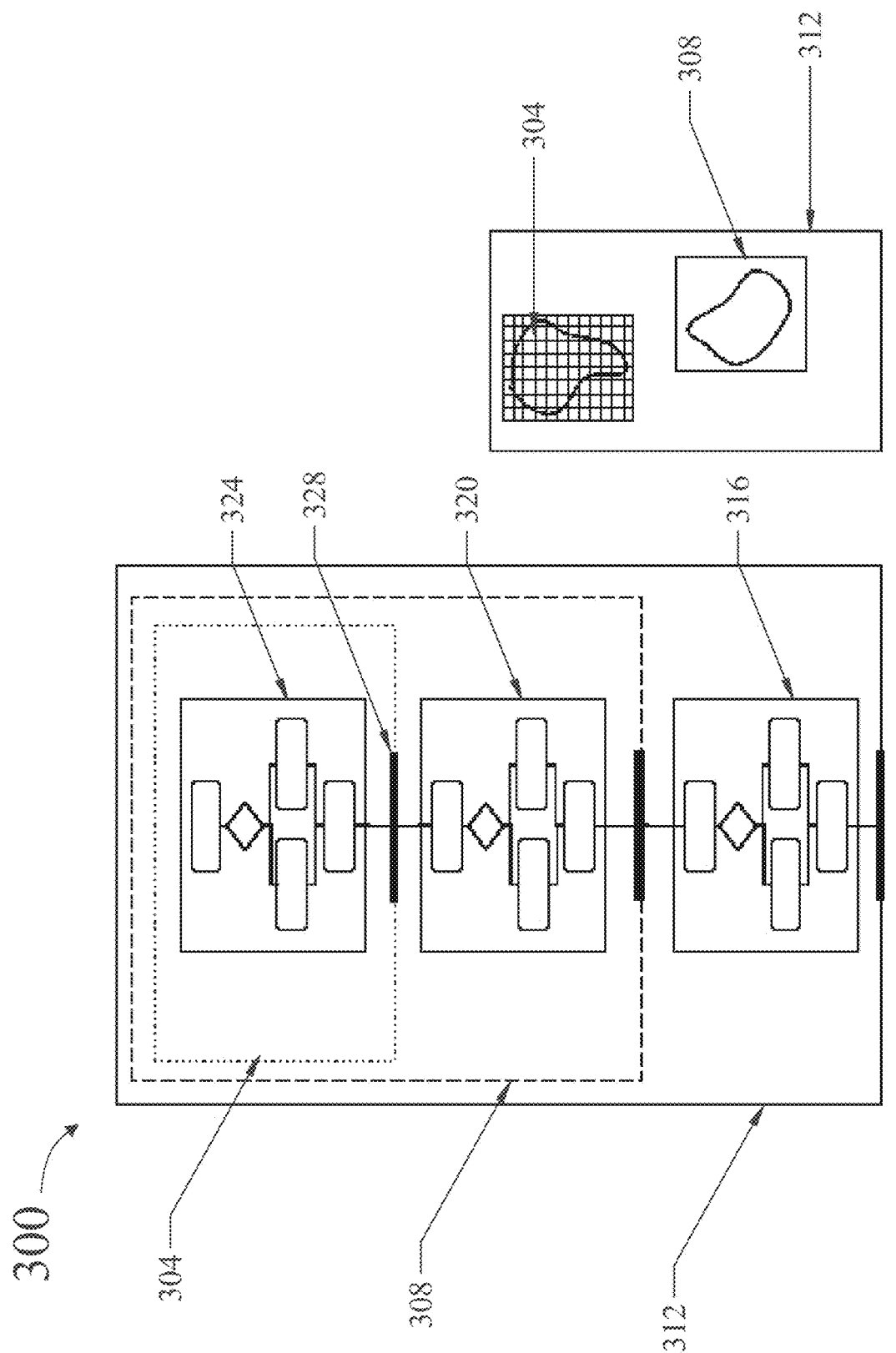
FIG. 3 is an exemplary embodiment of linking algorithm modules at different levels of abstraction.

Referring now to FIG. 3, is an exemplary embodiment, 300, of linking algorithm modules at different levels of abstraction is illustrated. In some cases, linking algorithm modules at different levels of abstraction, 300, includes image slide components characterized using composition while being imaged to generate a whole slide image (WSI). In this example, at the smallest level is the Field of View (FoV) Level, 304, and algorithms can be daisy chained to run for each FoV Level 324. FoV Level results can be consolidated 328 and passed to the next level of composition which is the Grid Level 308. A separate set of daisy chained algorithms can be run for each Grid level 320 (tissue chunk) separately. The results across multiple grids that form the Slide Level, 312, can be aggregated and passed to Slide Level daisy chained algorithms 316. In another embodiment, the results of slides belonging to a patient case can be aggregated and sent to another daisy chained algorithm block.

Figure 4:
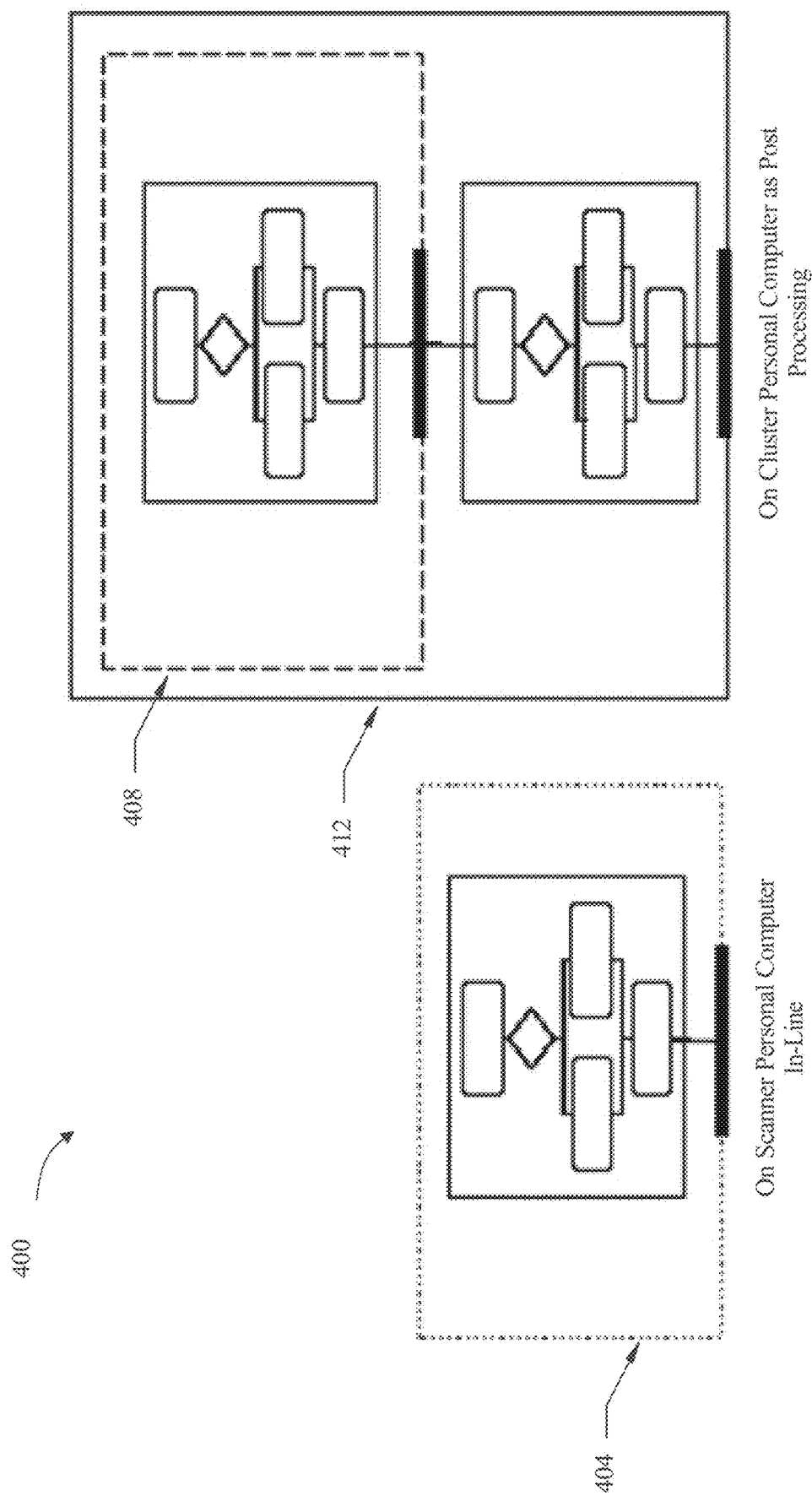
FIG. 4 is an exemplary embodiment of the distribution of algorithm modules over multiple machines.

Referring now to FIG. 4, is an exemplary embodiment, 400, of the distribution of algorithm modules over multiple machines is illustrated. In an embodiment, the daisy chaining of algorithms can be distributed over multiple machines. Part of the computation happens in-line on the scanner personal computer (PC), whereas the consolidated results for grid and the slide happen on the cluster PC managing multiple scanner heads. In another non-limiting example, algorithm module may operate on the cluster PC as described in U.S. patent application Ser. No. 18/538,959, filed on Dec. 13, 2023, titled "APPARATUS AND METHOD OF HOT-SWAPPING A COMPONENT OF A COMPONENT UNIT IN A CLUSTER," which is incorporated by reference herein in its entirety. In some cases, FoV Level algorithm daisy chain, 404, runs in-line on the scanner PC. In some cases, Grid Level algorithm daisy chain, 408, and Slide Level algorithm daisy chain, 412, consolidated results run on the cluster PC managing multiple scanner heads. In another non-limiting example, algorithm module may operate on PC cluster as well as the robotic arm device as described in U.S. patent application Ser. No. 18/382,386, filed on Oct. 20, 2023, titled "APPARATUS AND METHOD OF USE OF A MECHANISM THAT CONVERTS ROTARY MOTION INTO LINEAR MOTION," which is incorporated by reference herein in its entirety.

Figure 5:
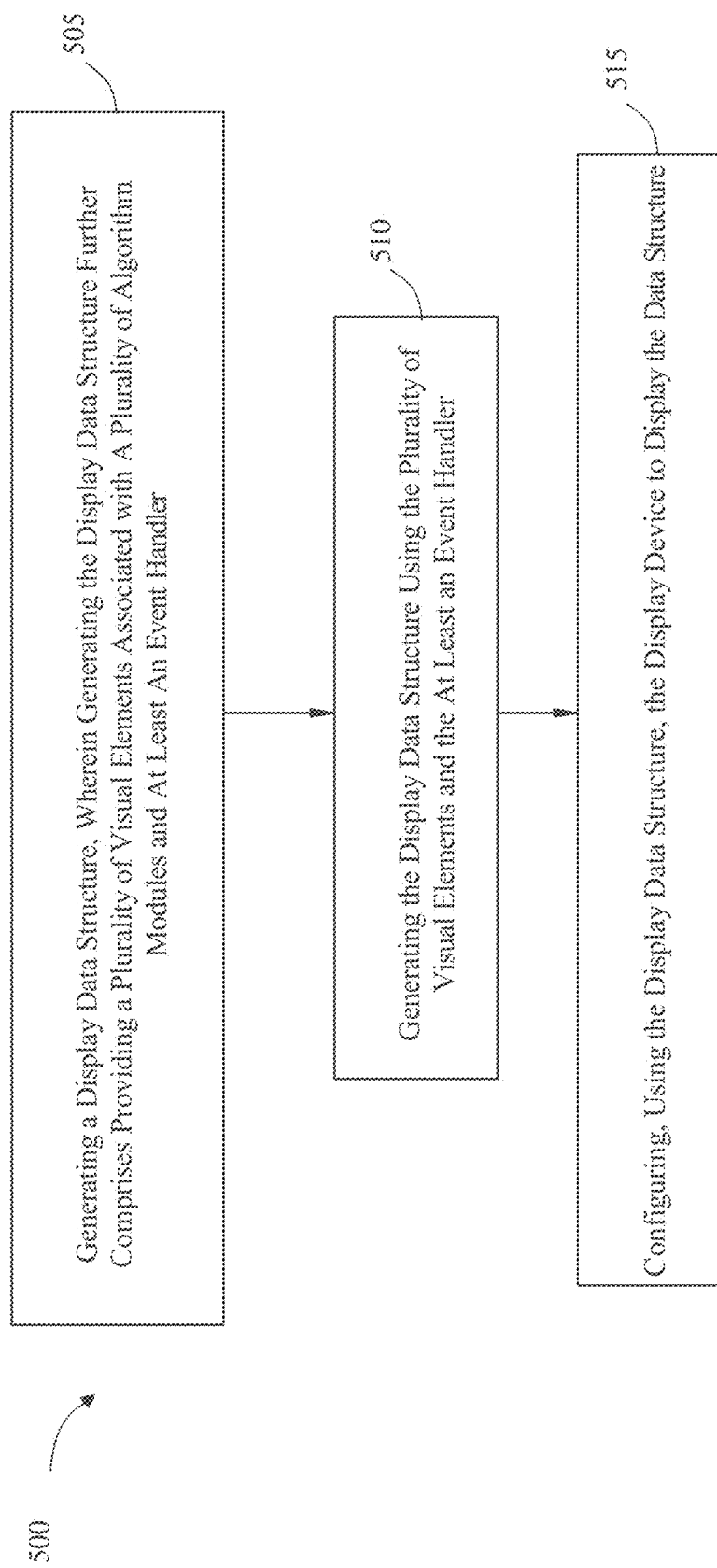
FIG. 5 is a block diagram of an exemplary method for control of image processing algorithms in a graphical interface.

Referring now to FIG. 5, a flow diagram of an exemplary method 500 for control of image processing algorithms in a graphical interface is illustrated. At step 505, method 500 includes generating, using at least a processor, a display data structure, wherein generating the display data structure further includes providing a plurality of visual elements associated with a plurality of algorithm modules and at least an event handler. In an embodiment, providing a plurality of visual elements associated with a plurality of algorithm modules and at least an event handler, wherein a first visual element of the plurality of visual elements is linked to a first algorithm module of the plurality of algorithm modules, a second visual element of the plurality of visual elements is linked to second algorithm module of the plurality of algorithm modules, the first algorithm module is configured to receive, using an image capturing device, a first image as a function of at least an imaging capturing device parameter, and execute, using a first control structure, the second algorithm module, and the second algorithm module is configured to modify the at least an imaging capturing device parameter as a function of the first image. This may be implemented as described and with reference to FIGS. 1-2.

Still referring to FIG. 5, at step 510, method 500 includes generating, using at least a processor, the display data structure using the plurality of visual elements and the at least an event handler. This may be implemented as described and with reference to FIGS. 1-2.

Still referring to FIG. 5, at step 515, method 500 includes configuring, using the display data structure, the display device to display the data structure. This may be implemented as described and with reference to FIGS. 1-2.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
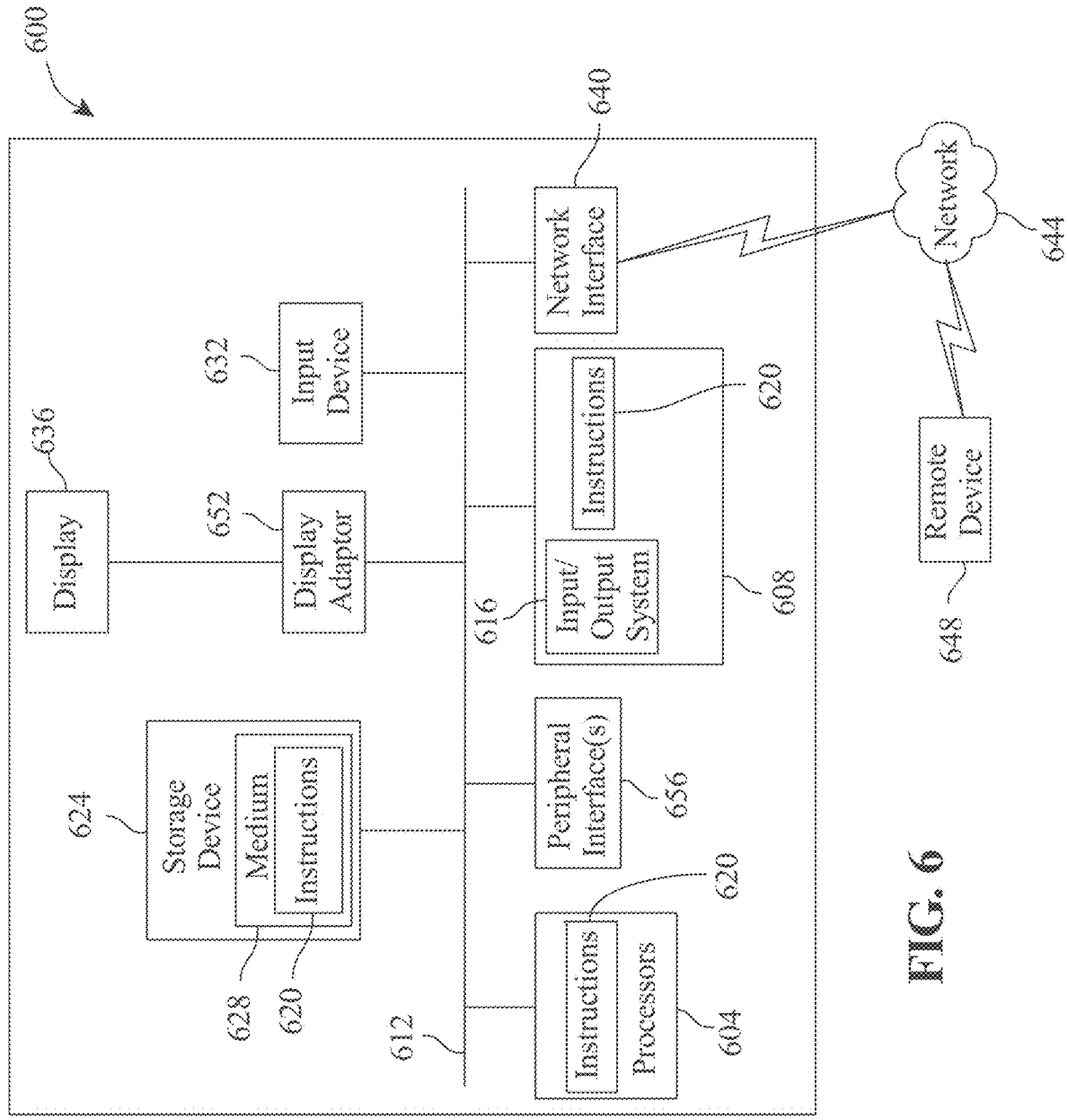
FIG. 6 is a block diagram of a computing apparatus that can be used to implement any one or more of the methodologies disclosed herein and any one or more portions thereof.

FIG. 6 shows a diagrammatic representation of one embodiment of computing device in the exemplary form of a computer apparatus 600 within which a set of instructions for causing a control apparatus to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer apparatus 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), apparatus on module (SOM), and/or apparatus on a chip (SoC).

Memory 608 may include various components (e.g., machine-readable media) including, but not limited to, a random-access memory component, a read only component, and any combinations thereof. In one example, a basic input/output apparatus 616 (BIOS), including basic routines that help to transfer information between elements within computer apparatus 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating apparatus, one or more application programs, other program modules, program data, and any combinations thereof.

Computer apparatus 600 may also include a storage device 624. Examples of a storage device (e.g., storage device 624) include, but not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer apparatus 600 (e.g., via an external port connector (not shown)). Particularly, storage device 624 and an associated machine-readable medium 628 may provide nonvolatile and/or volatile storage of machine-readable instructions, data structures, program modules, and/or other data for computer apparatus 600. In one example, software 620 may reside, completely or partially, within machine-readable medium 628. In another example, software 620 may reside, completely or partially, within processor 604.

Computer apparatus 600 may also include an input device 632. In one example, a user of computer apparatus 600 may enter commands and/or other information into computer apparatus 600 via input device 632. Examples of an input device 632 include, but are not limited to, an alpha-numeric input device (e.g., a keyboard), a pointing device, a joystick, a gamepad, an audio input device (e.g., a microphone, a voice response apparatus, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FTREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer apparatus 600 via storage device 624 (e.g., a removable disk drive, a flash drive, etc.) and/or network interface device 640. A network interface device, such as network interface device 640, may be utilized for connecting computer apparatus 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer apparatus 600 via network interface device 640.

Computer apparatus 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer apparatus 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed:

1. An apparatus for control of image processing algorithms in a graphical interface, wherein the apparatus comprises:
   at least a computing device, wherein the computing device comprises:

a display device, wherein the display device displays a graphical user interface;
a memory, wherein the memory stores instructions; and
a processor, communicatively connected to the memory, wherein the processor is configured to:
  generate a display data structure, wherein generating the display data structure further comprises:
    providing a plurality of visual elements associated with a plurality of algorithm modules and at least an event handler, wherein:
      a first visual element of the plurality of visual elements is linked to a first algorithm module of the plurality of algorithm modules;
      a second visual element of the plurality of visual elements is linked to second algorithm module of the plurality of algorithm modules;
      the first algorithm module is configured to:
        receive, using an image capturing device, a first image as a function of at least an imaging capturing device parameter; and
        execute, using a first control structure, the second algorithm module; and
      the second algorithm module is configured to:
        modify the at least an imaging capturing device parameter as a function of the first image; and
    generate the display data structure using the plurality of visual elements and the at least an event handler; and
  configure, using the display data structure, the display device to display the data structure.
2. The apparatus of claim 1, wherein:
a third visual element of the plurality of visual elements is linked to a third algorithm module of the plurality of algorithm modules;
the second algorithm module is further configured to:
  execute, using a second control structure, the third algorithm module; and
the third algorithm module is configured to:
  receive, using the image capturing device, a second image as a function of the at least a modified image capturing device parameter.
3. The apparatus of claim 1, wherein the at least an image capturing device parameter configures the image capturing device to operate at one or more of a slide level, a grid level, and a field of view level.
4. The apparatus of claim 1, wherein the first control structure is further configured to:
  evaluate at least a condition; and
  selectively execute the second algorithm module as a function of the at least a condition.
5. The apparatus of claim 1, wherein providing the plurality of visual elements associated with the plurality of algorithm modules and the at least an event handler, further comprises receiving the first algorithm module as a function of a rapid application development platform.
6. The apparatus of claim 1, wherein the processor is further configured to:
  receive, at the display device, an activation of the at least an event handler, wherein receiving the activation further comprises receiving a user input of at least a visual element of the plurality of visual elements that is linked to the at least an event handler; and
  execute at least an algorithm module associated with the at least an activated event handler wherein executing the at least an algorithm module comprises an image processing module, wherein the image processing module is configured to:
    receive, using the image capturing device, at least an initial image;
    process, using the image processing module, at least a modified image as a function of the at least an initial image; and
    output the at least a modified image.
7. The apparatus of claim 1, wherein the plurality of visual elements comprises a plurality of widgets, wherein the plurality of widgets comprises a component to modify scan acquisition parameters, a component to drag and drop the plurality of algorithm modules and the control structures, and a component to probe a sequence of the plurality of algorithm modules in specified locations.
8. The apparatus of claim 6, wherein the processor is further configured to execute the at least an algorithm module as a function of an edge computing platform, wherein the edge platform is configured to reduce computational latency by processing data closer to the source of data generation.
9. The apparatus of claim 6, wherein executing the at least an algorithm module comprises:
  verifying the at least an algorithm module;
  identifying an algorithm error; and
  indicating an algorithm correction.
10. The apparatus of claim 9, wherein indicating the algorithm correction is a function of the at least an event handler, wherein the at least an event handler comprises:
  transmitting an error notification using the graphical user interface; and
  transmitting a solution to the error using the graphical user interface.
11. A method of control of image processing algorithms in a graphical interface, wherein the method comprises:
  generating, using a processor of a computing device comprising: a display device configured to display a graphical user interface, a memory configured to store instructions, and the processor communicatively connected to the memory, a display data structure, wherein generating the display data structure further comprises:
    providing, using the processor, a plurality of visual elements associated with a plurality of algorithm modules and at least an event handler, wherein:
      a first visual element of the plurality of visual elements is linked to a first algorithm module of the plurality of algorithm modules;
      a second visual element of the plurality of visual elements is linked to second algorithm module of the plurality of algorithm modules;
      the first algorithm module is configured to:
        receive, using an image capturing device, a first image as a function of at least an imaging capturing device parameter; and
        execute, using a first control structure, the second algorithm module; and
      the second algorithm module is configured to:
        modify the at least an imaging capturing device parameter as a function of the first image; and
    generating, using the processor, the display data structure using the plurality of visual elements and the at least an event handler; and
  configuring, using the processor and the display data structure, the display device to display the data structure.
12. The method of claim 11, wherein:
a third visual element of the plurality of visual elements is linked to a third algorithm module of the plurality of algorithm modules;

the second algorithm module is further configured to:
execute, using a second control structure, the third algorithm module; and the third algorithm module is configured to:
receive, using the image capturing device, a second image as a function of the at least a modified image capturing device parameter.

13. The method of claim 11, wherein the at least an image capturing device parameter configures the image capturing device to operate at one or more of a slide level, a grid level, and a field of view level.

14. The method of claim 11, wherein the first control structure is further configured to:
evaluate at least a condition; and
selectively execute the second algorithm module as a function of the at least a condition.

15. The method of claim 11, wherein providing the plurality of visual elements associated with the plurality of algorithm modules and the at least an event handler, further comprises receiving the first algorithm module as a function of a rapid application development platform.

16. The method of claim 11, further comprising:
receiving, using the processor, at the display device, an activation of the at least an event handler, wherein receiving the activation further comprises receiving a user input of at least a visual element of the plurality of visual elements that is linked to the at least an event handler; and
executing, using the processor, at least an algorithm module associated with the at least an activated event handler wherein executing the at least an algorithm module comprises an image processing module, wherein the image processing module is configured to:
receive, using the image capturing device, at least an initial image;
process, using the image processing module, at least a modified image as a function of the at least an initial image; and
output the at least a modified image.

17. The method of claim 11, wherein the plurality of visual elements comprises a plurality of widgets, wherein the plurality of widgets comprises a component to modify scan acquisition parameters, a component to drag and drop the plurality of algorithm modules and the control structures, and a component to probe a sequence of the plurality of algorithm modules in specified locations.

18. The method of claim 16, wherein the processor is further configured to execute the at least an algorithm module as a function of an edge computing platform, wherein the edge platform is configured to reduce computational latency by processing data closer to the source of data generation.

19. The method of claim 16, wherein executing the at least an algorithm module comprises:
verifying the at least an algorithm module;
identifying an algorithm error; and
indicating an algorithm correction.

20. The method of claim 19, wherein indicating the algorithm correction is a function of the at least an event handler, wherein the at least an event handler comprises:
transmitting an error notification using the graphical user interface; and
transmitting a solution to the error using the graphical user interface.

\* \* \* \* \*